US012598654B2

(12) United States Patent
Huang-Fu et al.

(10) Patent No.: US 12,598,654 B2
(45) Date of Patent: Apr. 7, 2026

(54) HANDLING OF MBS SESSION RELATED BACK-OFF TIMER

(71) Applicant: MEDIATEK INC., Hsin-Chu (TW)

(72) Inventors: Chien-Chun Huang-Fu, Hsin-Chu (TW); Chi-Hsien Chen, Hsin-Chu (TW)

(73) Assignee: MediaTek Inc., Hsinchu City (TW)

( * ) Notice: Subject to any disclaimer, the term of this patent is extended or adjusted under 35 U.S.C. 154(b) by 579 days.

(21) Appl. No.: 18/088,340

(22) Filed: Dec. 23, 2022

(65) Prior Publication Data

US 2023/0224979 A1     Jul. 13, 2023

Related U.S. Application Data

(60) Provisional application No. 63/297,863, filed on Jan. 10, 2022.

(51) Int. Cl.
*H04W 4/00*      (2018.01)
*H04W 4/06*      (2009.01)
*H04W 48/10*     (2009.01)
*H04W 76/10*     (2018.01)

(52) U.S. Cl.
CPC ............. *H04W 76/10* (2018.02); *H04W 4/06* (2013.01); *H04W 48/10* (2013.01)

(58) Field of Classification Search
USPC ................................................. 370/329, 330
See application file for complete search history.

(56) References Cited

U.S. PATENT DOCUMENTS

2013/0301509 A1    11/2013  Purnadi
2018/0376444 A1    12/2018  Kim
2020/0008268 A1     1/2020  Huang-Fu
                    (Continued)

FOREIGN PATENT DOCUMENTS

CN        107211482 A      9/2017
CN        111200841 A     11/2018
                    (Continued)

OTHER PUBLICATIONS

European Intellectual Property Office Action 23150047.1-1215, dated Jun. 9, 2023 (18 pages).
                    (Continued)

*Primary Examiner* — Chuong T Ho
(74) *Attorney, Agent, or Firm* — Helen Mao; Zheng Jin; Imperium Patent Works

(57)      ABSTRACT

A method for handling the joining and leaving an MBS session via a PDU session establishment or modification procedure is provided. Upon receipt of a back-off timer in the Received MBS Container IE (with the operation/decision "MBS join is rejected" or "Remove UE from the MBS session"), the UE shall associate the MBS back-off timer with the MBS session ID (e.g., TMGI). If the timer value is neither zero nor deactivated, the UE should not request to join the MBS session with the same MBS session ID before the timer expiry. If the timer value is deactivated, the UE should not request to join the MBS session with the same MBS session ID until the UE is switched off, the USIM is removed, an entry in the "list of subscriber data" for the current SNPN is updated, or an event/notification is triggered by the network.

21 Claims, 5 Drawing Sheets

(56) References Cited

U.S. PATENT DOCUMENTS

| | | | | |
|---|---|---|---|---|
| 2020/0045753 | A1 | 2/2020 | Dao | |
| 2021/0352443 | A1 | 11/2021 | Matolia | |
| 2022/0272776 | A1* | 8/2022 | Tamura | H04W 76/30 |
| 2023/0209446 | A1* | 6/2023 | Kim | H04W 4/021 |
| | | | | 370/329 |
| 2023/0345310 | A1* | 10/2023 | Li | H04W 4/06 |
| 2023/0380002 | A1* | 11/2023 | Hong | H04W 68/005 |

FOREIGN PATENT DOCUMENTS

| | | | |
|---|---|---|---|
| CN | 112314043 A | 6/2019 | |
| CN | 110663284 A | 1/2020 | |
| CN | 113473383 A | 3/2020 | |
| CN | 113329516 A | 8/2021 | |
| KR | 20040067975 A | 3/2006 | |
| WO | 2020001520 A1 | 1/2020 | |
| WO | WO 2021/204131 A1 | 4/2020 | |
| WO | 2021208059 A1 | 10/2021 | |
| WO | 2021229346 A1 | 11/2021 | |

OTHER PUBLICATIONS

Taiwan Intellectual Property Office Action112100850 , dated Jun. 29, 2023 (12 pages).

Samsung Telecommunication: "Clarification on USIM/SIM card", 3GPP Draft; C1-151930 vol. CT WG1, No. Sanya; May 24, 2015-May 28, 2015, XP050972325.

Nokia et al: "Introducing MBS back-off timer for MBS join rejection", 3GPP Draft; CP-213053; vol. CT WG1, No., E-meeting; Oct. 11, 20211011-Oct. 15, 2021, XP052096475.

Apple: "Access Control for the MBS Service Reception", 3GPP Draft; R2-2107578; vol. RAN WG2, No. E-meeting;Aug. 9, 2021-Aug. 7, 2021, XP052034227.

Apple: "Access Control for the MBS Service Reception", 3GPP Draft; R2-2110028; vol. RAN WG2, No. E-meeting;Nov. 1, 2021-Nov. 12, 2021, XP052066478.

Huawei et al: "Handling of back-off timer at switch-on", 3GPP Draft; C1-152808_24.008, vol. CT WG1, No. Vancouver; Aug. 17, 2015-Aug. 21, 2015, XP050990194.

Huawei et al: "SM NAS level rejection for APN based congestion control", 3GPP Draft; C1-104642; vol. CT WG1, No. Jacksonville; Nov. 15, 2010, XP050465848.

ZTE: "Clarification on the EHPLMN list", 3GPP Draft;CP-203168,vol. CT WG1, No. Electronic meeting;Nov. 13, 2020-Nov. 20, 2020, XP051959698.

Intel Corp et al: "Addition of MS retry behavior for MBMS session management procedures", 3GPP Draft; vol. CT WG1, No. Belgrade (Serbia);Oct. 12, 2015-Oct. 16, 2015,XP051619084.

China Intellectual Property Office Action 202310016521.5 Dated May 16, 2025.

GPP TSG-CT WG1 Meeting #92 C1-151930 Samsung Telecommunications,Clarif ication on USIM/SIM card.

China Intellectual Property Office Action 2202310016521.5Dated Aug. 30, 2025 (No. English Translation Available).

«3GPP TSG-RAN WG3 Meeting #111-e R3-210639> Ericsson,"Session Management over NG" Jan. 15, 2021, Section 2-3.

3GPP tsg_ct\WG1_mm-cc-sm_ex CN1,TSGC1_92_Sanya, Samsung Telecommunications, C1-151930 "Clarificationon USIM/SIM card", May 16, 2015, Section 6.1.3.2.2.3.

* cited by examiner

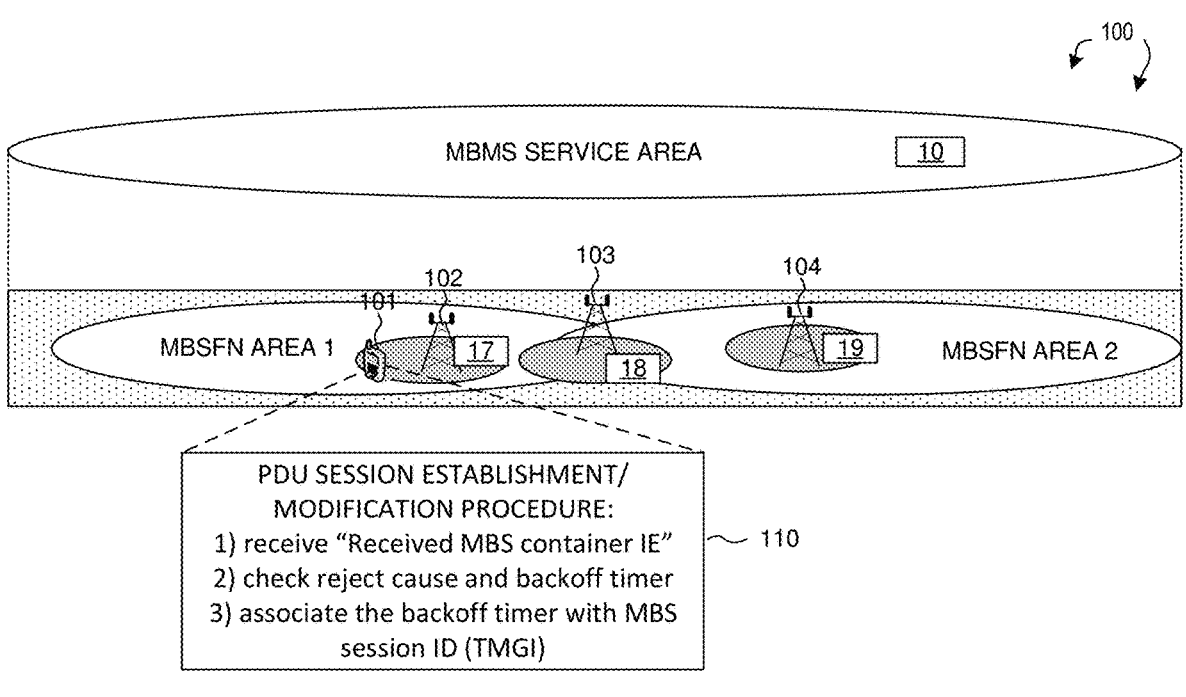

100

MBMS SERVICE AREA    10

103
102
104
101

MBSFN AREA 1    17    18    19    MBSFN AREA 2

PDU SESSION ESTABLISHMENT/
MODIFICATION PROCEDURE:
1) receive "Received MBS container IE"
2) check reject cause and backoff timer
3) associate the backoff timer with MBS
session ID (TMGI)

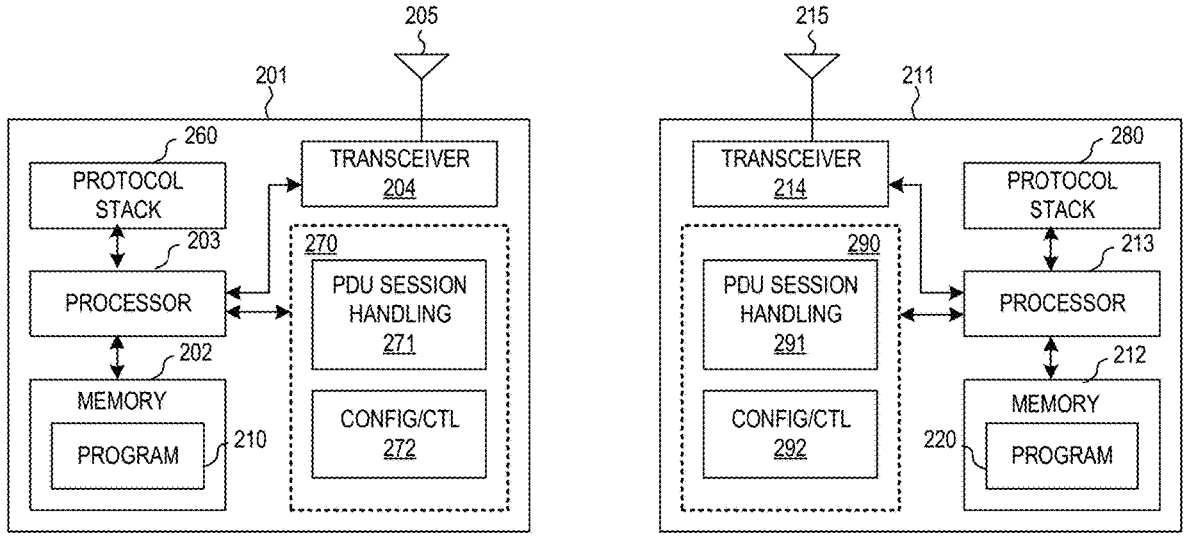

205     215

201     211

260   PROTOCOL STACK

TRANSCEIVER 204

270

PDU SESSION HANDLING 271

TRANSCEIVER 214

290

PDU SESSION HANDLING 291

280   PROTOCOL STACK

203   PROCESSOR

213   PROCESSOR

202   MEMORY

PROGRAM

210

CONFIG/CTL 272

CONFIG/CTL 292

220

212   MEMORY

PROGRAM

FIG. 2

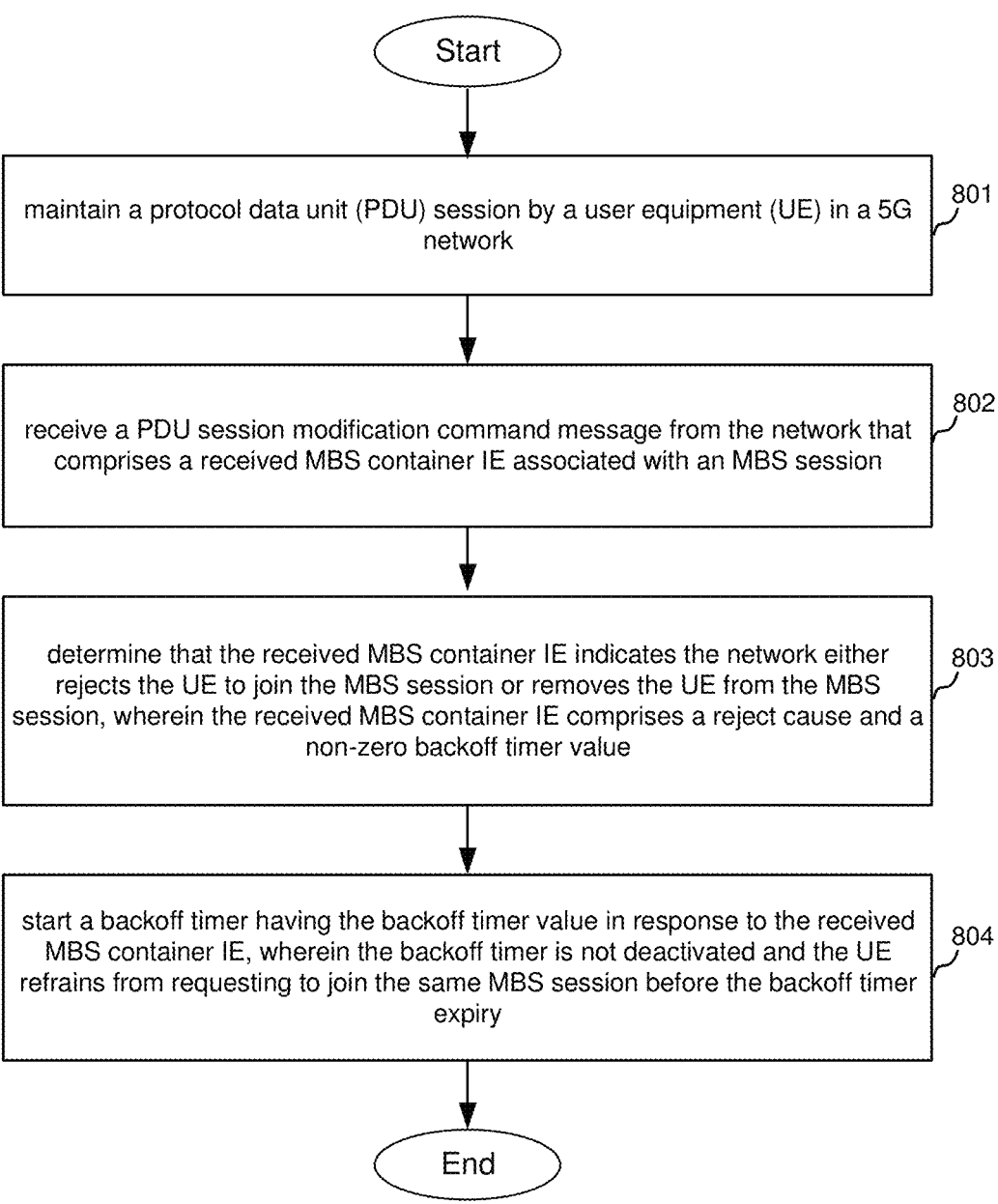

Start maintain a protocol data unit (PDU) session by a user equipment (UE) in a 5G network          801 receive a PDU session modification command message from the network that comprises a received MBS container IE associated with an MBS session          802 determine that the received MBS container IE indicates the network either rejects the UE to join the MBS session or removes the UE from the MBS session, wherein the received MBS container IE comprises a reject cause and a non-zero backoff timer value          803 start a backoff timer having the backoff timer value in response to the received MBS container IE, wherein the backoff timer is not deactivated and the UE refrains from requesting to join the same MBS session before the backoff timer expiry          804

End

FIG. 8

HANDLING OF MBS SESSION RELATED BACK-OFF TIMER

CROSS REFERENCE TO RELATED APPLICATIONS

This application claims priority under 35 U.S.C. § 119 from U.S. Provisional Application No. 63/297,863, entitled "Handling of MBS Session Related Back-Off Timer", filed on Jan. 10, 2022, the subject matter of which is incorporated herein by reference.

TECHNICAL FIELD

The disclosed embodiments relate generally to wireless communication, and, more particularly, to method for Multicast Broadcast Services (MBS) session handling in 5G systems.

BACKGROUND

The wireless communications network has grown exponentially over the years. A long-term evolution (LTE) system offers high peak data rates, low latency, improved system capacity, and low operating cost resulting from simplified network architecture. LTE systems, also known as the 4G system, also provide seamless integration to older wireless network, such as GSM, CDMA and universal mobile telecommunication system (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The next generation mobile network (NGMN) board has decided to focus the future NGMN activities on defining the end-to-end requirements for 5G new radio (NR) systems.

In 5G/NR, a protocol data unit (PDU) session defines the association between the UE and the data network that provides a PDU connectivity service. The PDU session establishment is a parallel procedure of PDN connection (bearer) procedure in 4G/LTE. Each PDU session is identified by a PDU session ID (PSI), and may include multiple QoS flows and QoS rules. Each PDU session can be established via a 5G access network (e.g., 3GPP radio access network (RAN), or via a non-3GPP RAN). Both the network and the UE can initiate different PDU session procedures, e.g., PDU session establishment procedure, PDU session modification procedure, and PDU session release procedure, for managing PDU sessions.

Multimedia Broadcast and Multicast Service (MBMS) is a broadcasting service offered via existing GSM and UMTS cellular networks. Recently, evolved MBMS (E-MBMS) has been introduced in the LTE specification for broadcasting or multicasting TV, films, and other information such as overnight transmission of newspapers in a digital form. In 5G networks, Multicast and Broadcast Services (MBS) is a point-to-multipoint service that can improve the network efficiency and user experience when transmitting the same content to multiple users. The design principle of 5G MBS is to minimize the implementation impact of the feature by reusing as much as possible 5G unicast architecture and functions.

UE can request to join an MBS by using PDU session establishment procedure or PDU session modification procedure with the Requested MBS container IE for the following MBS operations: Join MBS session and Leave MBS session. The network can also apply the PDU session establishment procedure or PDU session modification procedure with the Received MBS container IE for the following operations/decisions: MBS service area update, MBS join is accepted, MBS join is rejected, and Remove UE from the MBS session. However, it is not defined what should the UE do upon receipt of the operation/decision "MBS join is rejected" or "Remove UE from the MBS session" from the network.

A solution is sought.

SUMMARY

A method for handling the joining and leaving an MBS session via a PDU session establishment or modification procedure is provided. Upon receipt of a back-off timer in the Received MBS Container IE (with the operation/decision "MBS join is rejected" or "Remove UE from the MBS session"), the UE shall associate the MBS back-off timer with the MBS session ID (e.g., TMGI). If the timer value is neither zero nor deactivated, the UE should not request to join the MBS session with the same MBS session ID before the timer expiry. If the timer value is deactivated, the UE should not request to join the MBS session with the same MBS session ID until the UE is switched off, the USIM is removed, an entry in the "list of subscriber data" for the current SNPN is updated, or an event/notification is triggered by the network.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 1 illustrates an exemplary 5G network supporting Multicast Broadcast Services (MBS) and corresponding PDU session procedures in accordance with one novel aspect.

FIG. 2 illustrates simplified block diagrams of a user equipment (UE) and a network entity in accordance with embodiments of the current invention.

FIG. 8 is a flow chart of a method of MBS session handling via PDU session modification procedures in accordance with one novel aspect of the present invention.

DETAILED DESCRIPTION

Figures 3, 4:
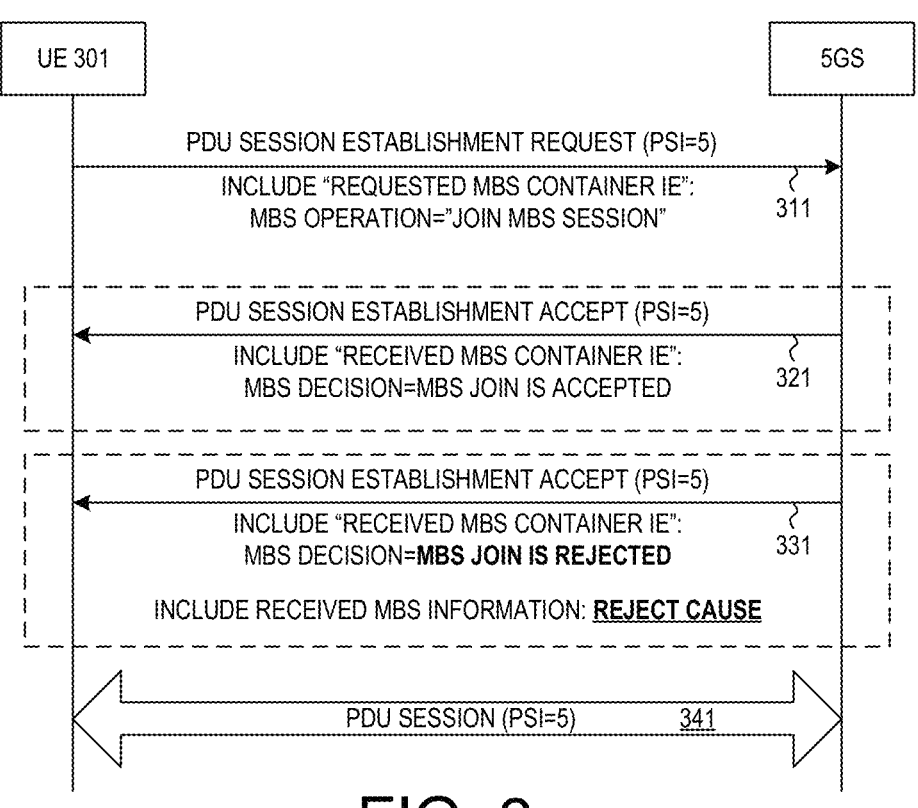
FIG. 3 illustrates one embodiment of PDU session establishment procedure where a UE requests to join an MBS session and corresponding handling for rejection in accordance with one novel aspect.
FIG. 4 illustrates one embodiment of PDU session modification procedure where a UE requests to join an MBS session and corresponding handling for rejection in accordance with one novel aspect.

Reference will now be made in detail to some embodiments of the invention, examples of which are illustrated in the accompanying drawings.

FIG. 1 illustrates an exemplary 5G network 100 supporting Multicast Broadcast Services (MBS) and corresponding PDU session procedures in accordance with one novel aspect. 5G new radio (NR) network 100 includes a user equipment (UE) 101 and a plurality of base stations gNB 102, gNB 103, and gNB 104. MBS service area 10 covers multiple MBS Single Frequency Network (MBSFN) areas (e.g., MBSFN area 1 and MBSFN area 2). An MBSFN area comprises a group of cells within an MBSFN service area of a network that are co-ordinate to achieve MBSFN transmission. An MBSFN service area is defined as an area of network in which all base stations (gNBs) can be synchronized to perform MBSFN transmission. MBS service areas are capable of supporting one or more MBSFN areas. On a given frequency layer, an eNB can only belong to one MBS service area. Under the MBS service area, a cell can belong to one or more MBSFN area and support MBS services for all the belonging MBSFN areas. In the example of FIG. 1, gNB 102 belongs to MBSFN area 1 and serves cell 17 for MBS service over a component carrier (CC), gNB 103 belongs to both MBSFN area 1 and area 2 and serves cell 18 for MBS service over the CC, gNB 104 belongs to MBSFN area 2 and serves cell 19 for MBS service over the CC. UE 101 registers to a PLMN, and subscribes to a specific MBS service in cell 17 served by gNB 102.

EPS ne works are packet-switched (PS) Internet Protocol (IP) networks. When a UE joins an evolved packet system (EPS) network, a Packet Data Network (PDN) address (i.e., the one that can be used on the PDN) is assigned to the UE for its connection to the PDN. In 4G, EPS has defined a Default EPS Bearer to provide the IP Connectivity that is Always-On. In 5G, a PDU session establishment procedure is a parallel procedure of a PDN connection procedure in 4G. A PDU session defines the association between the UE and the data network that provides a PDU connectivity service. Each PDU session is identified by a PDU session ID, and can be established over a 3GPP RAN, and/or over a non-3GPP RAN for radio access. 5G session management (5GSM) for PDU sessions over both 3GPP access and non-3GPP access are managed by AMF and SMF via NAS signaling.

Both the network and the UE can initiate different PDU session procedures, e.g., PDU session establishment procedure, PDU session modification procedure, and PDU session release procedure, for managing PDU sessions. UE can request to join an MBS by using PDU session establishment procedure or PDU session modification procedure with the Requested MBS container IE for the following MBS operations: Join MBS session and Leave MBS session. The network can also apply the PDU session establishment procedure or PDU session modification procedure with the Received MBS container IE for the following operations/decisions: MBS service area update, MBS join is accepted, MBS join is rejected, and Remove UE from the MBS session. However, it is not defined what should the UE do upon receipt of the operation/decision "MBS join is rejected" or "Remove UE from the MBS session" from the network.

In accordance with one novel aspect, a method for handling the joining and leaving an MBS session via a PDU session establishment or modification procedure is provided (110). Upon receipt of a back-off timer in the Received MBS Container IE (with the operation/decision "MBS join is rejected" or "Remove UE from the MBS session"), the UE shall associate the MBS back-off timer with the MBS session ID (e.g., TMGI). If the timer value is neither zero nor deactivated, the UE should not request to join the MBS session with the same MBS session ID before the timer expiry. If the timer value is deactivated, the UE should not request to join the MBS session with the same MBS session ID until the UE is switched off, the USIM is removed, an entry in the "list of subscriber data" for the current SNPN is updated, or an event/notification is triggered by the network.

FIG. 2 illustrates simplified block diagrams of wireless devices, e.g., a UE 201 and a network entity 211 in accordance with embodiments of the current invention. Network entity 211 may be a base station and/or an AMF/SMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes protocol stack 280 and a set of control function modules and circuits 290. Protocol stacks 280 includes Non-Access-Stratum (NAS) layer to communicate with an AMF/SMF/MME entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. In one example, control function modules and circuits 290 includes PDU session handling circuit 291 that handles PDU establishment, modification, and release procedures, and configuration and control circuit 292 that provides different parameters to configure and control UE of related functionalities including PDU session management.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also includes protocol stacks 260 and a set of control function modules and circuits 270. Protocol stacks 260 includes NAS layer to communicate with an AMF/SMF/MME entity connecting to the core network, RRC layer for high layer configuration and control, PDCP/RLC layer, MAC layer, and PHY layer. Control function modules and circuits 270 may be implemented and configured by software, firmware, hardware, and/or combination thereof. The control function modules and circuits, when executed by the processors via program instructions contained in the memory, interwork with each other to allow UE 201 to perform embodiments and functional tasks and features in the network.

In one example, control function modules and circuits 270 includes a PDU session handling circuit 271 that performs PDU session establishment, modification, and release procedures with the network, and a config and control circuit 272 that handles configuration and control parameters for mobility management and session management. Upon receiving a back-off timer in the Received MBS Container IE (with the operation/decision "MBS join is rejected" or "Remove UE from the MBS session"), the UE shall associate the MBS back-off timer with the MBS session ID (e.g., TMGI). The received cause/reason/indication may indicate whether UE can reattempt to join the MBS session in the registered PLMN or in all PLMN.

FIG. 3 illustrates one embodiment of PDU session establishment procedure where a UE requests to join an MBS session and corresponding handling for rejection in accordance with one novel aspect. In step 311, UE 301 initiates a PDU session establishment procedure by sending a PDU session establishment request message (for PSI=5) to the network, e.g., the session management function (SMF). The PDU session establishment request message includes a "Requested MBS container IE", with an MBS option="Join MBS Session" +MBS Session ID=TMGI or MBS Session ID type="source specific IP multicast address". The network can accept the PDU session establishment request, and either accept or reject the request for UE joining the MBS session. In a first scenario (step 321), the network sends a PDU session establishment accept message, which includes a "Received MBS Container IE", with an MBS decision="MBS join is accepted"+MBS Session ID=TMGI+"Source specific IP address and Destination IP address". The accept message may also include Received MBS information: MBS start time, MBS security container, MBS service area="MBS TAI list, the NE CGI list or both".

In a second scenario (step 331), the network sends a PDU session establishment accept message, which includes a "Received MBS Container IE", with an MBS decision="MBS join is rejected"+MBS Session ID=TMGI+ "Source specific IP address and Destination IP address". The accept message should also include Received MBS information: a reject cause, and may include MBS backoff timer if reject cause="MBS session has not started or will not start soon". The accept message may also include MBS service area="MBS TAI list, the NE CGI list or both". Upon receiving the PDU session establishment accept message, a PDU session (PSI=5) is established (step 341) for data communication.

If the network rejects the UE request to join the MBS session, the reject cause with reason or indication can indicate the subsequent UE behavior. For example, based on the reject cause, the UE knows the reason why the request for join the MBS session is rejected, and the UE can forward such reason to the upper layers/the users. In one example, the reject cause="UE is outside of local MBS service area" and the UE shall not request to join the same MBS session if the UE is camping on a cell that is outside the received MBS service area. The UE can invoke a default or preconfigured back-off timer upon receiving the reject cause. The UE can also know whether the UE can reattempt to join the MBS session in the registered PLMN or in all PLMN, depending on whether the re-attempt is set to "The back-off timer is applied in all PLMNs", or "The back-off timer is applied in the registered PLMN only". The UE will also know when the UE can reattempt to join the MBS session, e.g., when the UE is switched off, the USIM is removed, or the entry in the "list of subscriber data" for the current SNPN is updated, or event/notification triggered by the network (e.g., network-initiated de-registration).

FIG. 4 illustrates one embodiment of PDU session modification procedure where a UE requests to join an MBS session and corresponding handling for rejection in accordance with one novel aspect. In step 411, UE 401 maintains a PDU session (PSI=5) in a 5GS network. In step 421, UE 401 initiates a PDU session modification procedure by sending a PDU session modification request message (PSI=5) to the network, e.g., the SMF. The PDU session modification request message includes a "Requested MBS container IE", with an MBS option="Join MBS Session"+ MBS Session ID=TMGI or MBS Session ID type="source specific IP multicast address". The network can accept the PDU session modification request, and either accept or reject the request for UE joining the MBS session. In a first scenario (step 431), the network sends a PDU session modification command message, which includes a "Received MBS Container IE", with an MBS decision="MBS join is accepted"+MBS Session ID=TMGI "Source specific IP address and Destination IP address". The command message may also include Received MBS information: MBS start time, MBS security container, MBS service area="MBS TAI list, the NE CGI list or both".

In a second scenario (step 441), the network sends a PDU session modification command message, which includes a "Received MBS Container IE", with an MBS decision="MBS join is rejected"+MBS Session ID=TMGI+ "Source specific IP address and Destination IP address". The command message should also include Received MBS information: reject cause, and may include MBS backoff timer if reject cause="MBS session has not started or will not start soon". The accept message may also include MBS service area="MBS TAI list, the NE CGI list or both". Upon receiving the PDU session modification command message, UE 401 determines its behavior based on the reject cause and backoff timer.

Figure 5:
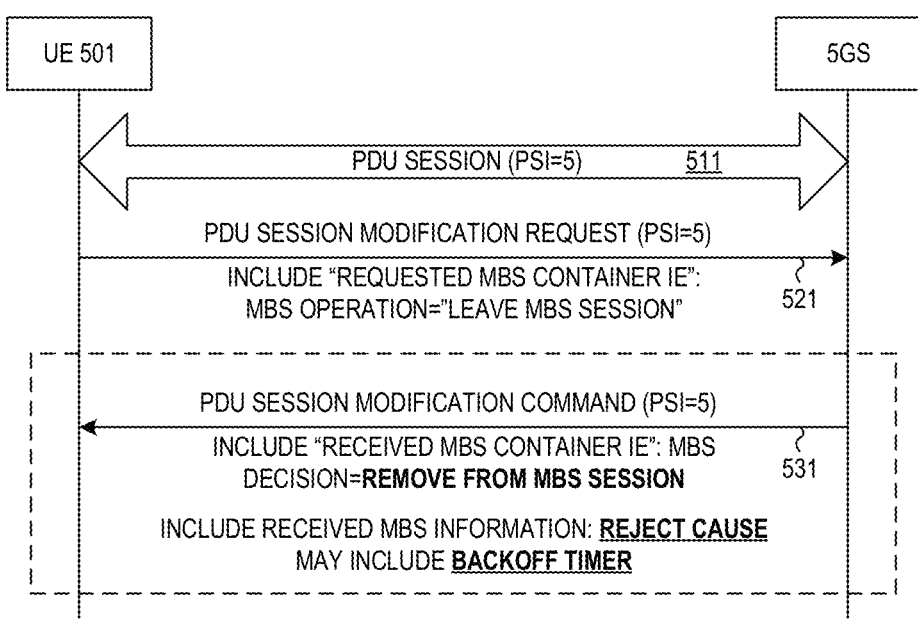
FIG. 5 illustrates another embodiment of PDU session modification procedure where a UE requests to leave an MBS session and corresponding handling for removing from the MBS session in accordance with one novel aspect.

FIG. 5 illustrates another embodiment of PDU session modification procedure where a UE requests to leave an MBS session and corresponding handling for removing from the MBS session in accordance with one novel aspect. In step 511, UE 501 maintains a PDU session (PSI=5) in a 5GS network. In step 521, UE 501 initiates a PDU session modification procedure by sending a PDU session modification request message (PSI=5) to the network, e.g., the SMF. The PDU session modification request message includes a "Requested MBS container IE", with an MBS option="Leave MBS session"+MBS session ID=TMGI. In step 531, UE 501 receives a PDU session modification command message from the network, which includes a "Received MBS Container IE", with an MBS decision="Remove UE from MBS session"+MBS Session ID=TMGI. The command message should also include Received MBS information: reject cause="MBS session is released" if UE triggered or others, and may include MBS backoff timer. The command message may also include Received MBS information: MBS service area="MBS TAI list, the NE CGI list or both".

Upon receipt of a back-off timer in the Received MBS Container IE (with the operation/decision "MBS join is rejected" as in FIG. 4, or "Remove UE from the MBS session" as in FIG. 5), the UE shall associate the MBS back-off timer with the MBS session ID (e.g., TMGI). If the timer value is neither zero nor deactivated, the UE should not request to join the MBS session with the same MBS session ID (e.g., TMGI) before the timer expiry, e.g., any request to join the MBS session in the current PDU session (PSI=5) or in any other PDU sessions is prohibited. If the timer value is deactivated, the UE should not request to join the MBS session with the same MBS session ID (e.g., TMGI) until after the UE is switched off, or the USIM is removed, or the entry in the "list of subscriber data" for the current SNPN is updated or event/notification triggered by NW (e.g., Network-initiated de-registration). The MBS back-off timer is associated with the MBS session ID (and optionally with the PLMN when MBS roaming is supported). Therefore, the UE cannot attempt to join the MBS session (e.g., identified by the TMGI) in another PDU session, and/or after the UE is switched off (i.e., keep running the MBS BO timer when the UE is switched off), or the USIM is removed, or the entry in the "list of subscriber data" for the current SNPN is updated, or event/notification triggered by NW (e.g., Network-initiated de-registration).

Figure 6:
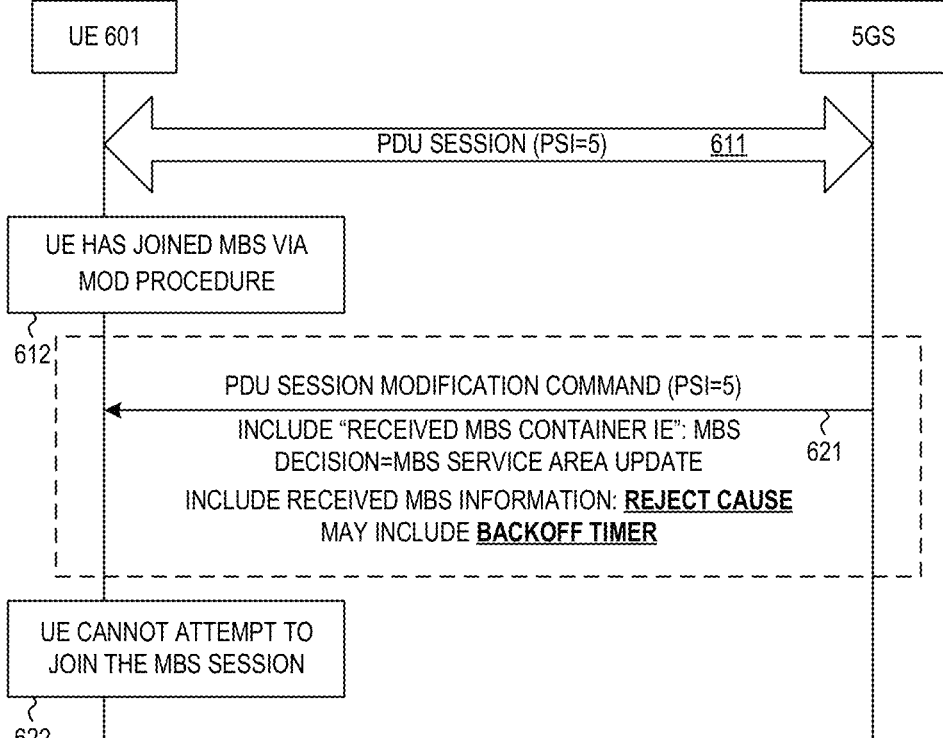
FIG. 6 illustrates one embodiment of PDU session modification procedure where the network performs MBS service area update with reject cause and backoff timer in accordance with one novel aspect.

FIG. 6 illustrates one embodiment of PDU session modification procedure where the network performs MBS service area update with reject cause and backoff timer in accordance with one novel aspect. In step 611, UE 601 maintains a PDU session (PSI=5) in a 5GS network. In step 612, UE 601 has joined an MBS session via a PDU session modification procedure, as illustrated in FIG. 4 above. In step 621, the network initiates an MBS session service area update by sending a PDU session modification command message to UE 601. The PDU session modification command message includes a "Received MBS Container IE", with an MBS decision="MBS service area update"+MBS Session ID=TMGI. The command message should also include Received MBS information: MBS service area="MBS TAI list, the NE CGI list or both". The command message should also include Received MBS information of reject cause and may include MBS backoff timer. In one example, a three-bit field can be used to indicate the rejection cause including: user is outside of local MBS service area, session context not found, or MBS session is released.

Figure 7:
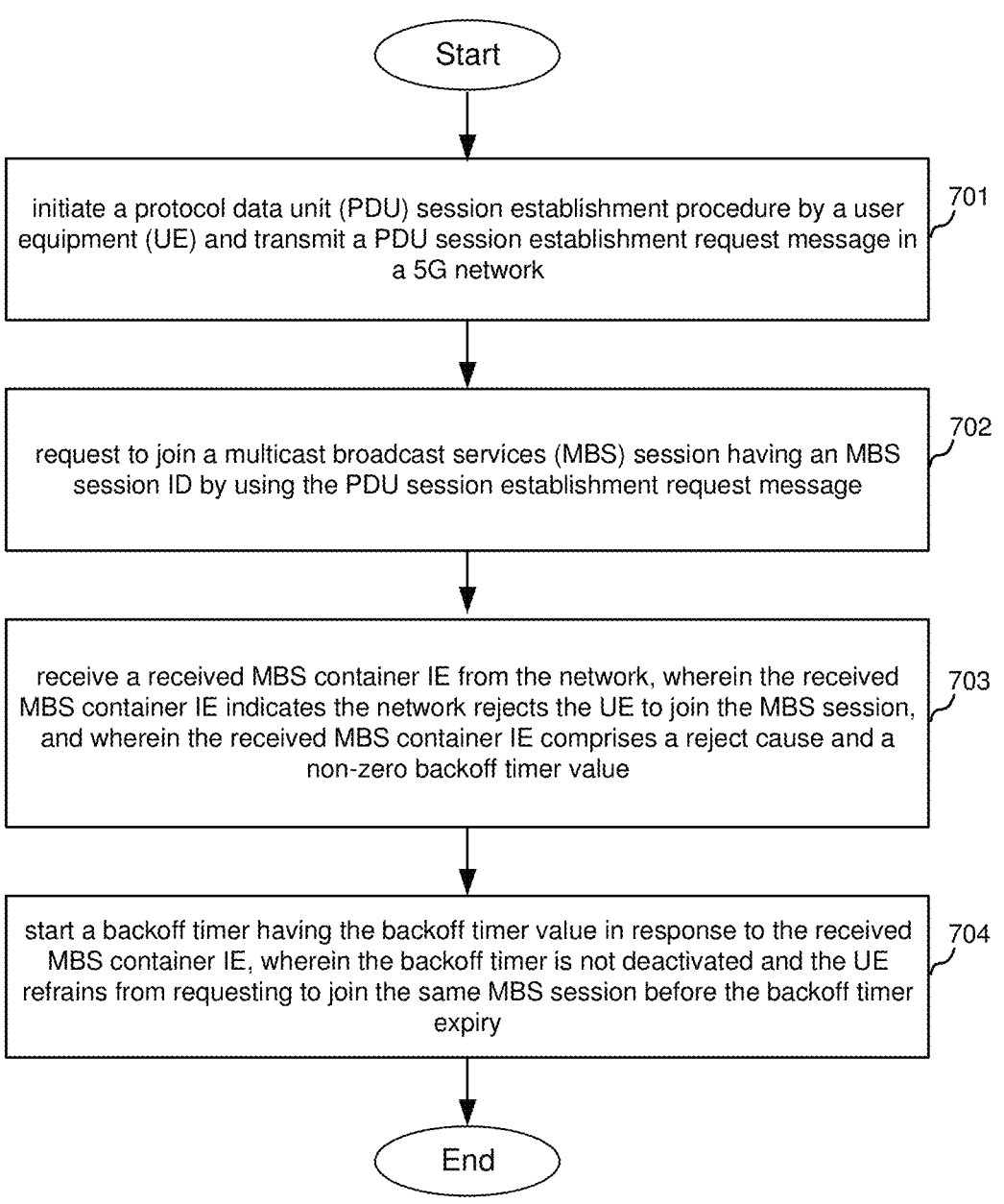
FIG. 7 is a flow chart of a method of MBS session handling via PDU session establishment procedures in accordance with one novel aspect of the present invention.

FIG. 7 is a flow chart of a method of MBS session handling via PDU session establishment procedures in accordance with one novel aspect of the present invention. In step 701, a UE initiates a protocol data unit (PDU) session establishment procedure and transmits a PDU session establishment request message in a 5G network. In step 702, the UE requests to join a multicast broadcast services (MBS) session having an MBS session ID by using the PDU session establishment request message. In step 703, the UE receives a received MBS container IE from the network, wherein the received MBS container IE indicates the network rejects the UE to join the MBS session, and wherein the received MBS container IE comprises a reject cause and a non-zero backoff timer value. In step 704, the UE starts a backoff timer having the backoff timer value in response to the received MBS container IE. The backoff timer is not deactivated and the UE refrains from requesting to join the same MBS session before the backoff timer expiry.

FIG. 8 is a flow chart of a method of MBS session handling via PDU session modification procedures in accordance with one novel aspect of the present invention. In step 801, a UE maintains a protocol data unit (PDU) session in a 5G network. In step 802, the UE receives a PDU session modification command message from the network, wherein the PDU session modification command message comprises a received MBS container IE associated with an MBS session. In step 803, the UE determines that the received MBS container IE indicates the network either rejects the UE to join the MBS session or removes the UE from the MBS session, wherein the received MBS container IE comprises a reject cause and a non-zero backoff timer value. In step 804, the UE starts a backoff timer having the backoff timer value in response to the received MBS container IE. The backoff timer is not deactivated and the UE is refrains from requesting to join the same MBS session before the backoff timer expiry.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
initiating a protocol data unit (PDU) session establishment procedure by a user equipment (UE) and transmitting a PDU session establishment request message in a 5G network;
requesting to join a multicast broadcast services (MBS) session having an MBS session ID by using the PDU session establishment request message;
receiving a received MBS container IE from the network, wherein the received MBS container IE indicates the network rejects the UE to join the MBS session, and wherein the received MBS container IE comprises a reject cause and a non-zero backoff timer value; and
starting a backoff timer having the backoff timer value in response to the received MBS container IE, wherein the backoff timer is not deactivated and the UE refrains from requesting to join the same MBS session before the backoff timer expiry.

2. The method of claim 1, wherein the PDU session establishment request message comprises an MBS operation that is set to request joining the MBS session.

3. The method of claim 1, wherein the reject cause indicates the MBS session has not started or will not start soon.

4. The method of claim 1, wherein the backoff timer is deactivated, and wherein the UE is forbidden to request joining the same MBS session until the UE is switched off, a USIM is removed, an entry in a list of subscriber data is updated, or an event or notification is triggered by the network.

5. The method of claim 1, wherein the UE attempts to join the MBS session in another PLMN when the backoff timer is applicable to a registered PLMN only.

6. A method, comprising:
maintaining a protocol data unit (PDU) session by a user equipment (UE) in a 5G network;
receiving a PDU session modification command message from the network, wherein the PDU session modification command message comprises a received multicast broadcast services (MBS) container IE associated with an MBS session;
determining that the received MBS container IE indicates the network either rejects the UE to join the MBS session or removes the UE from the MBS session, wherein the received MBS container IE comprises a reject cause and a non-zero backoff timer value; and starting a backoff timer having the backoff timer value in response to the received MBS container IE, wherein the backoff timer is not deactivated and the UE refrains from requesting to join the same MBS session before the backoff timer expiry.

7. The method of claim 6, wherein the PDU session modification command message is in response to a PDU session modification request message sent by the UE.

8. The method of claim 7, wherein the PDU session modification request message comprises an MBS operation that is set to request joining the MBS session.

9. The method of claim 8, wherein the reject cause indicates the MBS session has not started or will not start within a time duration.

10. The method of claim 7, wherein the PDU session modification request message comprises an MBS operation that is set to request leaving the MBS session.

11. The method of claim 10, wherein the reject cause indicates the MBS session is released.

12. The method of claim 6, wherein the PDU session modification command message is initiated by the network without any UE request.

13. The method of claim 6, wherein the backoff timer is deactivated, and wherein the UE is forbidden to request joining the same MBS session until the UE is switched off, a USIM is removed, an entry in a list of subscriber data is updated, or an event or notification is triggered by the network.

14. A User Equipment (UE), comprising:

a protocol data unit (PDU) session handling circuit that maintains a PDU session in a 5G network;

a receiver that receives a PDU session modification command message from the network, wherein the PDU session modification command message comprises a received multicast broadcast services (MBS) container IE associated with an MBS session;

a control circuit that determines the received MBS container IE indicates the network either rejects the UE to join the MBS session or removes the UE from the MBS session, wherein the received MBS container IE comprises a reject cause and a backoff timer value; and a backoff timer having the backoff timer value, wherein the UE starts the backoff timer in response to the received MBS container IE and refrains from requesting to join the same MBS session before the timer expiry.

15. The UE of claim 14, wherein the PDU session modification command message is in response to a PDU session modification request message sent by the UE.

16. The UE of claim 15, wherein the PDU session modification request message comprises an MBS operation that is set to request joining the MBS session.

17. The UE of claim 16, wherein the reject cause indicates the MBS session has not started or will not start within a time duration.

18. The UE of claim 15, wherein the PDU session modification request message comprises an MBS operation that is set to request leaving the MBS session.

19. The UE of claim 18, wherein the reject cause indicates the MBS session is released.

20. The UE of claim 13, wherein the PDU session modification command message is initiated by the network without any UE request.

21. The UE of claim 13, wherein the backoff timer is deactivated, and wherein the UE is forbidden to request joining the same MBS session until the UE is switched off, a USIM is removed, an entry in a list of subscriber data is updated, or an event or notification is triggered by the network.

* * * * *